(12) United States Patent
Nishiyuki et al.

(10) Patent No.: US 8,939,121 B2
(45) Date of Patent: Jan. 27, 2015

(54) GLOW PLUG FITTED WITH COMBUSTION PRESSURE DETECTION SENSOR

(75) Inventors: Kenjiro Nishiyuki, Inazawa (JP);
Masahiro Kawakatsu, Komaki (JP);
Yoshihiro Nakamura, Komaki (JP);
Masayoshi Matsui, Ichinomiya (JP);
Shunsuke Maeda, Toyota (JP); Tadashi Watanabe, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 363 days.

(21) Appl. No.: 13/588,092

(22) Filed: Aug. 17, 2012

(65) Prior Publication Data
US 2013/0042831 A1 Feb. 21, 2013

(30) Foreign Application Priority Data

Aug. 19, 2011 (JP) ................................. 2011-179808
Aug. 10, 2012 (JP) ................................. 2012-178562

(51) Int. Cl.
*F23Q 7/00* (2006.01)
*G01L 23/10* (2006.01)
*F02P 19/02* (2006.01)

(52) U.S. Cl.
CPC .............. *F23Q 7/001* (2013.01); *F02P 19/028* (2013.01); *F23Q 2007/002* (2013.01); *G01L 23/10* (2013.01)
USPC ..................... 123/145 A; 219/270; 73/114.16; 73/114.18

(58) Field of Classification Search
CPC ....... G01M 15/08; G01L 23/10; G01L 23/08; G01L 23/22; F23Q 7/001; F23Q 2007/002; F23Q 2007/004; F23Q 2007/005; F02P 19/028
USPC .............. 123/143 R, 145 R, 145 A; 219/270; 73/114.16, 114.18
See application file for complete search history.

(56) References Cited

U.S. PATENT DOCUMENTS 7,581,520 B2 * 9/2009 Kern et al. ................. 123/145 A
7,712,444 B2 * 5/2010 Kern et al. ................. 123/145 A
7,905,209 B2 * 3/2011 Goto et al. ................. 123/143 R (Continued)

FOREIGN PATENT DOCUMENTS

DE  10 2005 061 879 A1   7/2007
DE  10 2006 057 627 A1   6/2008
DE  10 2007 049 971 A1   4/2009
EP     2 169 374 A2      3/2010

(Continued)

OTHER PUBLICATIONS

Search Report dated Dec. 13, 2012, issued by the European Patent Office in counterpart European Patent Application No. 12181031.1.

*Primary Examiner* — Thomas Moulis
(74) *Attorney, Agent, or Firm* — Sughrue Mion, PLLC

(57) ABSTRACT

A glow plug in which a convex portion (70) is formed in an outer peripheral surface (10*b*) of a heater (10) in a part facing an inner peripheral surface (137*b*) of a leading end part (137) of a housing (110) and interposed in a leading end side annular gap K1, so as to maintain a gap with the inner peripheral surface (137*b*). A decline in detection accuracy can be prevented to the extent that combustion gas can be received by the leading end (72) of the convex portion (70) even if soot clogging should occur.

4 Claims, 9 Drawing Sheets

(56) References Cited

U.S. PATENT DOCUMENTS

| | | | |
|---|---|---|---|
| 7,954,382 B2 * | 6/2011 | Kern et al. | 73/715 |
| 8,003,917 B2 * | 8/2011 | Kern et al. | 219/270 |
| 8,250,909 B2 * | 8/2012 | Kern et al. | 73/114.16 |
| 8,356,511 B2 * | 1/2013 | Ramond et al. | 73/114.16 |
| 2009/0321408 A1 | 12/2009 | Kern et al. | |
| 2010/0037698 A1 | 2/2010 | Kern et al. | |
| 2010/0079155 A1 | 4/2010 | Matsuoka et al. | |
| 2012/0011924 A1 * | 1/2012 | Ramond et al. | 73/114.01 |

FOREIGN PATENT DOCUMENTS

| | | |
|---|---|---|
| FR | 2 955 172 A1 | 7/2011 |
| JP | 2010139148 A | 6/2010 |
| WO | 2007/073959 A1 | 7/2007 |
| WO | 2008/110496 A1 | 9/2008 |
| WO | 2009/053170 A1 | 4/2009 |
| WO | 2011/085959 A1 | 7/2011 |

* cited by examiner

GLOW PLUG FITTED WITH COMBUSTION PRESSURE DETECTION SENSOR

BACKGROUND OF THE INVENTION

1. Field of the Invention

The present invention relates to a glow plug fitted with a combustion pressure detection sensor including a function of promoting ignition in a combustion chamber of an engine and additionally sensing (detecting) the combustion pressure.

2. Description of the Related Art

Various glow plugs including a combustion pressure detection sensor (hereinafter, also referred to as a glow plug) have been known (see, for example, Patent Document 1). FIG. 8 is a partial longitudinal cross-sectional view that shows a simplified cross-sectional structure of this kind of glow plug. The glow plug 901 of FIG. 8 includes a rod-like (a circular rod shape) heater (for example, a sheath heater or a ceramic heater) 10 generating heat by applying voltage to a housing 110 forming a cylindrical shape. A leading end (an end of a side protruding into the combustion chamber, not shown) 10a of the heater protrudes from a leading end 136 of the housing 110. In addition, "a two-dot chain line" in FIGS. 8 and 9 shows a portion in the vicinity of a combustion chamber N in an engine head.

Since in the glow plug 901, the combustion pressure is detected based on displacements of the heater 10 due to the combustion pressure and a center pole (a pole member) or the like which is fixed thereto and extended rearward due to the combustion pressure or based on pressure applied to the sensor as a result of displacement of the center pole or the like, the heater 10 is placed in the housing 110 so as to be slightly displaceable in the front and rear direction thereof (a axial direction G). For this reason, the heater 10 is placed so as to maintain a gap (an annular gap) with an inner peripheral surface of the housing 110. Further, as a detecting means for detecting the displacement generated in the heater 10 or the like, for example, a piezo-electric element 40 is placed behind the heater 10. The glow plug is configured so as to compress the piezo-electric element 40 by force pressing the heater 10 rearward by the combustion pressure and displacing the heater 10. The combustion pressure is detected by measuring an electric signal generated according to a change in the compression force. In addition, the glow plug of Patent Document 1 is configured so that a strain gauge is adopted as the detecting means. By deforming a distortion member with displacement of the heater, the combustion pressure is detected using a sensor (a strain sensor) installed therein, based on the amount of deformation.

However, in the glow plug 901 including the combustion pressure detection sensor, there is a need to prevent (by securing with a seal) combustion gas of high temperature and high pressure from entering the housing 110 rearward from a leading end 136 of the housing 110 through an annular gap between the inner peripheral surface thereof and an outer peripheral surface of the heater 10. For this reason, in the glow plug 901 of FIG. 8, as shown in an enlarged views of FIG. 8 and FIG. 9, in a relatively expanded-diameter annular space K2 behind a leading end side annular gap K1 provided between the inner peripheral surface of a leading end part 131 of the housing 110 and the outer peripheral surface of the heater 10, a seal member 60 is provided. In this arrangement, the front and rear of the expanded-diameter annular space K2 is blocked in an airtight state.

Since the seal member 60 needs to allow for displacement of the heater 10 in the axial direction G relative to the housing 110, the seal member 60 is formed of a heat resistant material having a sufficiently resilient annular film portion (a membrane) 63. This may be a thin metal film (for example, a thin film made from SUS 630) which itself is capable of being deformed in a frontward and rearward direction (the axial direction G) such as a bellows or a diaphragm that is formed in a deformable manner. The seal member 60 of FIG. 8 has an annular film portion 63 so as to partition the front and rear of the expanded-diameter annular space K2 between a small-diameter cylinder portion 65 forming a cylindrical portion of a leading end side and a large-diameter cylinder portion 61 of a rear end side. In the expanded-diameter annular space K2, the small-diameter cylinder portion 65 is adhered along an outer peripheral surface of the heater 10, and is welded (laser welded) the outer peripheral surface of the heater 10 at a predetermined location (a triangle portion shaded black) W1. Moreover, the large-diameter cylinder portion 61 is fixed to the housing 110 side along a circumferential direction at a predetermined location (triangle portion shaded black) of the rear end side thereof at W2 and W3 by welding. Thus, sealing in the forward and rearward direction is secured between the inner peripheral surface of the part near the leading end of housing 110 and the outer peripheral surface of the heater 10.

The glow plug 901 mentioned above is screwed into a plug hole of the engine head, and the leading end 10a of the heater 10 is installed so as to be exposed to the inside of the combustion chamber. As a result, the combustion gas pressurizes the entire exposed heater 10, and enters the expanded-diameter annular space K2 via the leading end side annular gap K1 between the inner peripheral surface of the leading end part 131 of the housing 110 and the outer peripheral surface of the heater 10 to pressurize a leading end facing surface (mainly, the annular film portion 63) of the seal member 60 therein. Thus, the heater 10 is displaced so as to be pressed rearward based on an action of deforming the seal member 60 rearward due to the combustion pressure (herein, referred to as pressure) received by a leading end facing surface of the seal member 60 provided in the expanded-diameter annular space K2, in addition to the combustion pressure received in the leading end 10a of the heater itself.

That is, in the glow plug 901 of the structure mentioned above, the action in which the seal member 60 itself is deformed rearward contributes to displacing the heater 10 rearward or compressing the piezo-electric element 40, and the detection of the combustion pressure is performed based on this action. That is, in the glow plug, since the heater 10 is displaced rearward by the combustion pressure received by the heater itself and the seal member 60, the pressure of the combustion gas received by the seal member 60 greatly affects the detection accuracy of the combustion pressure.

[Patent Document 1] JP-A-2010-139148

3. Problems to be Solved by the Invention

On the one hand, the combustion gas of the engine contains soot. For this reason, in the glow plug 901 of the structure mentioned above, soot enters the space K2 in which the seal member 60 is placed therein through the leading end side annular gap K1 between the inner peripheral surface of the leading end part 131 of the housing 110 and the outer peripheral surface of the heater 10. Moreover, as shown in FIG. 9A, the soot S attaches to the surfaces of each portion and accumulates. On the other hand, a gap size of one side in a radial direction in the annular gap (the leading end side annular gap) K1 between the inner peripheral surface of the leading end part 131 of the housing 110 and the outer peripheral surface of the heater 10 is minute such as approximately 0.25 mm to 0.30 mm. For this reason, when the attachment and accumulation of the soot proceeds, as shown in FIG. 9B, the soot S also attaches and accumulates on the inner peripheral surface of the leading end part 131 of the housing facing the leading end side annular space K1 and the outer peripheral surface of the heater 10, and thus the narrowed leading end side annular gap K1 enters a soot clogging state (a sealing state).

That is, in a glow plug with a combustion pressure detection sensor of the related art, when such a soot clogging state occurs, the combustion gas does not reach the leading end facing surface of the seal member 60. For this reason, in the combustion gas, most of the force pressing the heater 10 rearward becomes a pressure component applied to the leading end 10a of the heater 10, and thus, as a result, the detection accuracy (sensitivity) of the combustion pressure is reduced. In addition, the soot S forming the soot clogging in the leading end side annular gap K1 between the inner peripheral surface of the leading end part 131 of the housing 110 and the outer peripheral surface of the heater 10 acts to bond both these members in addition to generating frictional resistance therebetween. Thus, a movement of the heater 10 is restrained. Such soot clogging hinders the free displacement of the heater 10 rearward in addition to reducing the pressure-receiving area of the combustion pressure (an area of the leading end facing surface of the seal member). Thus, in the glow plug mentioned above, due to soot clogging, a problem arises in that the detection accuracy (sensitivity) of the pressure is reduced. In addition, when soot clogging occurs, pressure is applied to the seal member 60 via the soot. Since the deposited soot S has rubber-like elasticity, a cushioning action of relaxing and absorbing the pressure results, and thus pressure is barely applied to the seal member 60.

SUMMARY OF THE INVENTION

The present invention has been made to solve the above problems of the related art, and an object thereof is to prevent the problem of soot clogging in the leading end side annular gap between the inner peripheral surface of the leading end part of the housing and the outer peripheral surface of the heater, such that the combustion pressure freely acts on the seal member or the membrane member, and as a result, the detection accuracy of the combustion pressure is maintained.

The above objects of the invention have been achieved by providing (1) a glow plug having a leading front end and an opposing rear end, and including a combustion pressure detection sensor, the glow plug comprising: a housing having a cylindrical shape which houses a heater having a pillar shape, a leading end of the heater protruding from a leading end of the housing; and a sensor that detects the combustion pressure based on displacement of the heater by action of the combustion pressure, the glow plug having an annular gap between an inner peripheral surface of a leading end part of a predetermined range from the leading end of the housing toward a rear part thereof and an outer peripheral surface of the heater, and a deformable seal member allowing for displacement of the heater is provided in the annular gap so as to divide the annular gap into front and rear sides, wherein, in the outer peripheral surface of the heater, in a part facing the inner peripheral surface of the leading end part of the housing interposed in the annular gap, a convex portion protruding outward in a radial direction is formed so as to maintain a gap with the inner peripheral surface, wherein the leading end of the convex portion is formed so as to be located to the front of the leading end of the housing, wherein in the seal member, an inner periphery edge portion at the outer peripheral surface side of the heater has a cylindrical portion bent and extended frontwards, the cylindrical portion being fixed to the outer peripheral surface of the heater, and wherein in a radical direction, an outermost peripheral portion of the convex portion is located outside the outer peripheral portion of a leading end of the cylindrical portion of the seal member.

In a preferred embodiment (2) of the glow plug (1) above, a leading end side annular gap forms between the inner peripheral surface of the leading end part of the predetermined range from the leading end of the housing toward the rear part thereof and the outer peripheral surface of the heater, an inner peripheral surface of a part of the housing near the leading end thereof and to the rear of the leading end side annular gap forms an expanded-diameter annular inner peripheral surface having a diameter greater than that of the inner peripheral surface of the leading end part, and the seal member is provided in an expanded-diameter annular space defined between the expanded-diameter annular inner peripheral surface and the outer peripheral surface of the heater so as to divide the expanded-diameter annular space into front and rear sides.

In another preferred embodiment (3) of the glow plug (2) above, the convex portion includes a protrusion portion protruding outward in the radial direction from an outer peripheral surface of the convex portion in the leading end thereof.

In yet another preferred embodiment (4) of the glow plug (1), the convex portion is formed of a cylindrical body or an annular body externally fitted and fixed to the heater.

4. Effects of the Invention

In the glow plug including the combustion pressure detection sensor of the related art, when soot generated in the process of the combustion of the engine attaches and accumulates on the outer peripheral surface or the like of the heater in the annular gap to cause soot clogging, such soot clogging prevents the combustion pressure from being directly applied to the leading end facing surface of the seal member. Accordingly, pressure pressing the heater rearward or force displacing the heater is reduced compared to a case where there is no soot clogging and the same gas pressure is directly applied to the seal member, and thus, the detection accuracy of the combustion pressure is reduced.

To the contrary, in the present invention, in the outer peripheral surface of the heater, in a part facing the inner peripheral surface of the leading end part of the housing, the convex portion mentioned above is provided. For this reason, even if soot clogging occurs in the annular gap, in a state where the leading end facing surface (the leading end surface and the leading end facing end surface) of the convex portion provided therein is exposed without being buried in the soot, the force by which the combustion gas presses the heater rearward also acts on the leading end facing surface of the convex portion together with the leading end surface of the heater. For this reason, in the present invention, even if pressure pressing the heater rearward or force displacing the heater in a case where the soot clogging occurs is reduced, to the extent that the combustion pressure can act on the leading end facing surface of the convex portion, a decline in the displacing force is compensated. Thus, it is possible to reduce or delay a decline in detection accuracy of the combustion pressure.

Furthermore, in the present invention, when locating the leading end of the convex portion further to the front than the leading end of the housing, even if soot clogging is present up to the leading end of the housing in the annular gap, the leading end (the leading end facing surface) of the convex portion is not buried in the soot. Meanwhile, when the soot clogging proceeds up to the leading end of the housing, the further proceeding is nearly performed. For this reason, even in such a soot clogging state, since the combustion pressure can be received by the leading end facing surface of the convex portion, by locating the leading end of the convex portion to the front of the leading end of the housing, a reduction in the detection accuracy of the combustion pressure can be reduced, so as to maintain an operating state for a long period of time. That is to say, it is preferable to locate the leading end of the convex portion at the front side than the leading end of the housing as much as possible.

The inner peripheral end edge portion of the seal member has a cylindrical portion bent and extended frontwards. In the case where the cylindrical portion is fixed to the outer peripheral surface of the heater, when the leading end of the cylindrical portion extends up to the part of the annular gap, the leading end of the cylindrical portion serves in a manner similar to the convex portion. However, the thickness of the plate material forming the seal member or the cylindrical portion is merely 0.15 to 0.30 mm. Although the thickness of the seal member is based on securing easy deformation properties, in the cylindrical portion, the pressure receiving area of the combustion gas at the leading end of the convex portion cannot be sufficiently secured. Thus, by locating the outermost peripheral portion of the convex portion outside the outer peripheral portion of the leading end of the cylindrical portion of the seal member in the radial direction, the pressure receiving area of the combustion gas can be secured.

In the present invention, the convex portion forms a continuous ring shape in the entire circumferential direction on the outer peripheral surface of the heater, but it is desirable to greatly secure the area (the pressure receiving area) of the leading end facing surface of the convex portion. However, for example, even if a plurality of non-continuous members such as the teeth of a gear wheel is provided as the convex portion, since the pressure receiving area can be secured to a greater extent by the convex portion as compared to the related art in which the convex portion is not provided, even in a soot clogging state the detection accuracy of the sensor is increased.

In the present invention, the seal member is provided so as to divide the annular gap into front and rear sides formed between the inner peripheral surface of the leading end part of the housing and the outer peripheral surface of the heater. That is, in the present invention, the inner peripheral surface of the leading end part of the housing may be straight toward the leading end (maintaining the same diameter). However, as described in (2) above, the inner peripheral surface of the part near the leading end of the housing to the rear of the leading end side annular gap is an expanded-diameter annular inner peripheral surface having a diameter greater than that of the inner peripheral surface of the leading end part, and the seal member is preferably provided in an expanded-diameter annular space defined between the expanded-diameter annular inner peripheral surface and the outer peripheral surface of the heater in such manner that the expanded-diameter annular space is divided into front and rear sides. As a result, it is possible to reduce the ratio at which high-temperature combustion gas directly impacts the seal member. In the glow plug including the combustion pressure detection sensor, the gap size (the gap of one side of the outer peripheral surface of the heater and the inner peripheral surface of the leading end part of the housing) of the leading end side annular gap does not interfere with the front and rear movement (the displacement in the axial direction) of the heater. Thus, when considering the vibration movement of the heater due to impact or the like, the gap between the outer peripheral surface of the heater and the inner peripheral surface of the leading end part of the housing can be 0.25 mm or more, and about 0.30 mm is an upper limit in consideration of the configuration of the glow plug. For this reason, it is difficult to set the radial outward size of the convex portion alone by the leading end side annular gap so as to increase the pressure receiving area of the leading end surface of the convex portion. However, by locating the leading end of the convex portion to the front of the leading end of the housing as in the present invention, there is no restriction mentioned above. In addition, although the rear end of the convex portion is preferably located to the rear of the inner peripheral portion of the leading end part of the housing which defines the leading end side annular gap, the rear end of the convex portion may be located within the leading end side annular gap.

Furthermore, as in the invention described in (3) above, by forming the protrusion portion protruding outward in the radial direction from an outer peripheral surface of the convex portion in the leading end thereof, the pressure receiving area of the combustion gas in the leading end surface of the convex portion can be greatly secured. In addition, in the invention described in (3) above, the convex portion is preferably provided over the whole periphery and the protrusion portion also preferably from the annular flange on the whole periphery.

Furthermore, although the convex portion may be formed so as to uplift the outer peripheral surface of the metal pipe forming the outer peripheral surface of the heater partially in the circumferential direction forming and wholly in the circumferential direction, as in the invention described in (4) above, the convex portion may be formed of a cylindrical body or the annular body externally fitted and fixed to the heater. When configured in this manner, by externally fitting and welding the cylindrical body or the annular body to the heater, the formation thereof is possible, and thus, the formation is easy. In addition, in the metal glow plug, the outer peripheral surface of the heater means the outer peripheral surface of the sheath pipe constituting the heater. Furthermore, in the ceramic glow plug, the outer peripheral surface of the heater means the outer peripheral surface of the ceramic heater having the convex portion is directly formed on the outer peripheral surface of the ceramic heater. The metallic pipe forming the convex portion is externally fitted to the ceramic heater, and since the convex portion is formed in the pipe, the outer peripheral surface of the heater means the outer peripheral surface of the pipe.

5. DESCRIPTION OF REFERENCE NUMERALS

Figure 1:
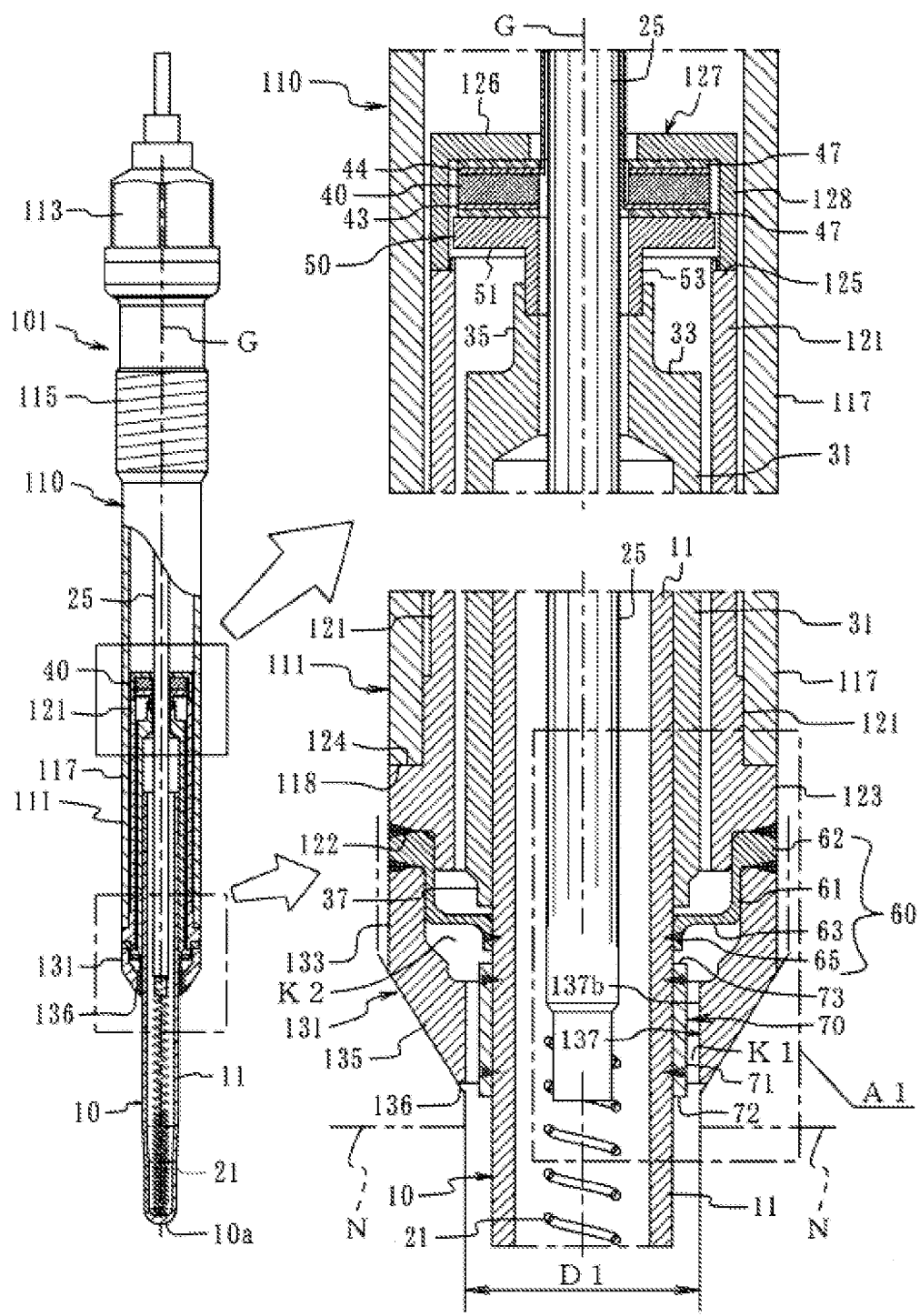
FIG. 1 is a partially broken view of a glow plug with a combustion pressure detection sensor (a first embodiment of the present invention), and an enlarged view of each portion including major parts and a piezo-electric element.

Reference numerals used to identify various structural features in the drawings including the following.
- 10 heater
- 10a leading end of heater
- 10b outer peripheral surface of heater
- 40 piezo-electric element (sensor)
- 60 seal member
- 65 cylindrical portion
- 70 convex portion
- 71 outer peripheral surface of convex portion
- 72 leading end of convex
- 75 protrusion portion
- 101 glow plug fitted with a combustion pressure detection sensor
- 110 housing
- 132 expanded-diameter inner peripheral surface
- 136 leading end of housing
- 137 leading end part of a predetermined range rearward from leading end of housing
- 137b inner peripheral surface of leading end part
- K1 leading end side annular gap
- K2 expanded-diameter annular space
- T2 height dimension protruding from outer peripheral surface outward in radial direction in convex portion

DETAILED DESCRIPTION OF THE PREFERRED EMBODIMENTS

The glow plug with the combustion pressure detection of a first embodiment of the present invention is described with reference to FIGS. 1 to 4. However, the present invention could not be construed as being limited thereto.

Figure 2:
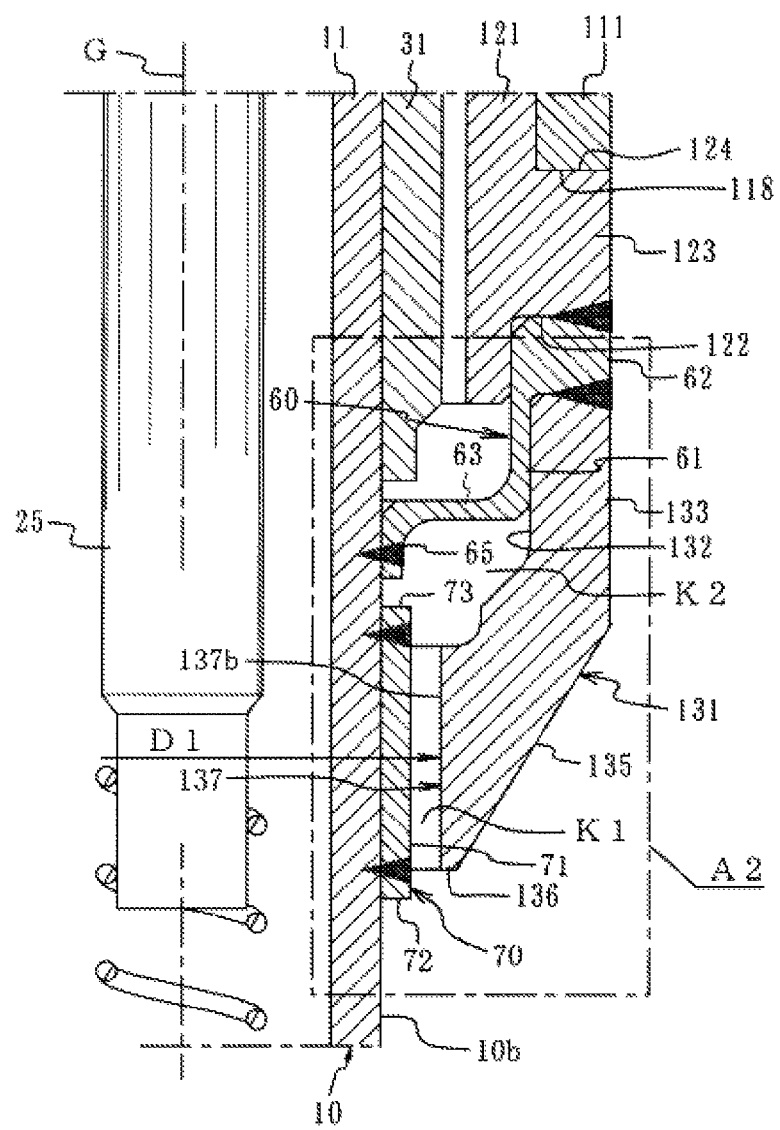
FIG. 2 is an enlarged view of the A1 portion of FIG. 1.
Figure 3:
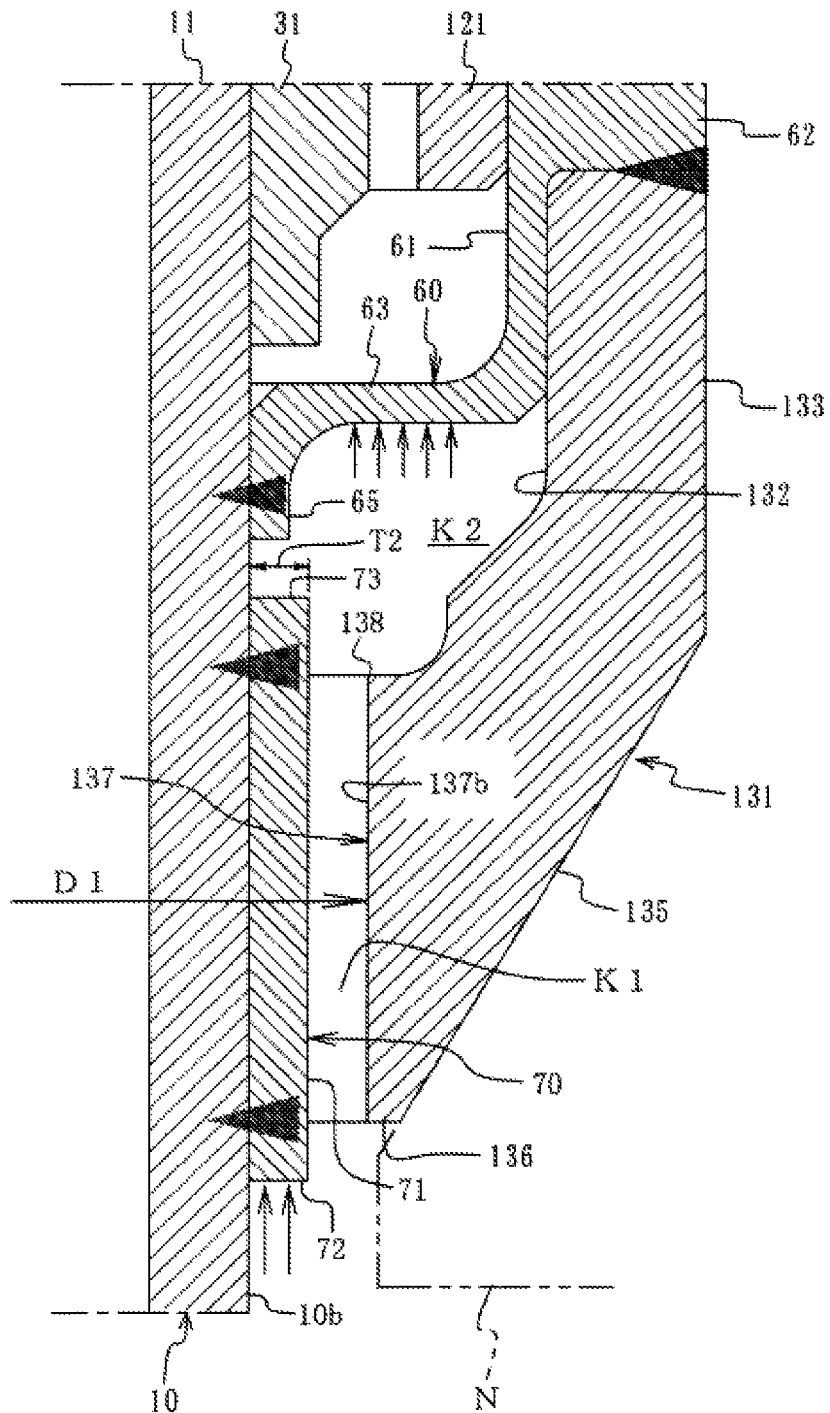
FIG. 3 is an enlarged view of the A2 portion of FIG. 2.

A glow plug 101 of the present example mainly includes a substantially cylindrical housing 110, a sheath heater 10 having a leading end (herein, a lower end) 10a projecting from a leading end 136 of the housing 110, and a piezo-electric element 40 placed at the rear end side of the sheath heater 10 or the like. At this point, the present invention has basically the same configuration as that of the glow plug having a combustion pressure detection section of the related art. Meanwhile, as shown in FIGS. 2, 3 and the like, the glow plug of the present embodiment is formed so as to interpose a leading end side annular gap K1 between an inner peripheral surface 137b of a leading end part of a predetermined range rearward from the leading end of the housing 110 and the outer peripheral surface 10b of the heater 10, and wherein the projection portion 70 protrudes outward in the radial direction so as to maintain a gap with the inner peripheral surface 137b. However, hereinafter, the entire configuration of the glow plug 101 will be described in detail. In addition, although the details will be described below, in the present example, the housing 110 is constituted by a housing main body 111, a leading end side housing 131 placed in the leading end thereof or the like.

That is, in the present example, the housing 110 includes three components of a substantially cylindrical housing main body 111, a piezo-electric element supporting internal housing 121 which is inserted into the inside thereof and is inserted and placed in the housing main body 111 so as to support the piezo-electric element 40 in the rear end of the sheath heater 10, and a leading end side housing 131 which is located at the leading end side of the housing main body 111 and constitutes a leading end part and a portion near the leading end of the housing (see FIG. 1). Among them, the housing main body 111 includes a screw fixing polygonal portion 113 on the outer peripheral surface of the part near the rear end and includes a screw fixing screw 115 of the cylinder head on the outer peripheral surface of the leading end side thereof. The leading end side of the screw 115 includes a cylindrical pipe portion 117 forming a diameter slightly smaller than the diameter of the screw 115. Moreover, the piezo-electric supporting internal housing 121 is inserted and placed on the inner peripheral surface of the part near the leading end of the cylindrical pipe portion 117.

The element supporting internal housing 121 includes a flange 123 protruding from the outer peripheral surface of the leading end side. The outer diameter of the flange 123 is the same as that of the cylindrical pipe portion 117 of the housing main body 111. As shown in the enlarged view of FIG. 1 and FIG. 2, the flange 123 brings the rear end facing surface 124 of the flange 123 into contact with the leading end 118 of the housing main body 111, and for example, fixes the rear end facing surface 124 by welding. Meanwhile, as shown in the enlarged view of FIG. 1, a cylindrical cap 127 having an annular bottom plate 126 having an opened center is welded to the rear end of the element supporting internal housing 121 via the leading end of the cylindrical portion 128. Moreover, the piezo-electric element 40 forming a ring shape, in which insulating plate 47 is placed via electrode plates 43 and 44 on both side surfaces, is placed in the cylindrical cap 127 by an arrangement coming into contact with the annular bottom plate 126. In addition, a wiring (not shown) is drawn rearward from the respective electrode plates 43 and 44.

On the one hand, the sheath heater 10 has a hemispherical shape with a convex leading end 10a, and includes a sheath pipe 11 formed of a circular pipe extending rearward, a heating coil 21 connected to the leading end of the inside thereof and which is set in place by a form extending rearward, and an electric conducting pole member (a circular pole member) 25 connected to the rear end of the heating coil 21 in the sheath pipe 11 and extending rearward or the like. In the present example, the electric conducting pole member 25 projects from the rear end of the sheath pipe 11, and a sheath pipe exterior pipe 31 blocking the rear end of the sheath pipe 11 is externally fitted to the part near the rear end of the sheath pipe 11 (see FIG. 1). However, the sheath heater 10 forms a rod shape as a whole, and about a half its length near the leading end of the sheath pipe 11 is set so as to project from the leading end 136 of the housing 110. Furthermore, as shown in the enlarged view of FIG. 1, the rear end of the sheath pipe exterior pipe 31 has a circular rear end bottom portion 33 having a reduced diameter so as to project the electric conducting pole member 25, and a cylindrical portion 35 is formed on the rear end facing surface of the rear end bottom portion 33 in the projected shape. In addition, in the present embodiment, the sheath pipe exterior pipe 31 is held so that an axial location of the leading end thereof is substantially the same as that of the leading end of the element supporting internal housing 121 but extending slightly frontward where an outer diameter thereof is a small thin portion 37. Moreover, for example, the sheath pipe exterior pipe 31 is welded and fixed to the outer peripheral surface of the sheath pipe 11 along the circumferential direction.

On the other hand, the electric conducting pole member 25 extends rearward in the housing 110 along the pole G so as to penetrate inside the cylindrical portion 35 of the rear end of the sheath pipe exterior pipe 31, inside a pressing body 50 described below placed behind the cylindrical portion 35, and each inside (through hole) of the piezo-electric element 40, and the annular bottom plate 126 of the cylindrical cap 127. Moreover, the rear end of the electric conducting pole member 25 is fixed to the rear end of the housing main body 111 so as to be held by an insulating member (not shown) or the like, and projects outward. In addition, insulating powders (not shown) are filled in the sheath pipe 11 and the rear end thereof is sealed by a rubber member or the like.

Between the cylindrical portion 35 in the rear end portion of the sheath pipe exterior pipe 31 externally fitted to the sheath heater 10 and the electrode plate 43 and the insulating plate 47 placed at the leading end of the piezo-electric element 40, an arched plate portion 51 having the same diameter as that of the insulating plate 47, and a pressing body 50 having a small arched body 53 having the same center as that and extended forward are placed. The small arched portion 53 of the pressing body 50 is fixed to the cylindrical portion 35 in the rear end portion of the sheath pipe exterior pipe 31 in a coaxial manner. However, the sheath heater 10 having a leading end 10a projects from the leading end 136 of the housing 110 having a cylindrical shape as mentioned above, and places the leading end 10a in the element supporting internal housing 121 in a state of maintaining a gap with the inner peripheral surface of the housing 121. When pressed rearward, the piezo-electric element 40 placed at the rear end 125 side of the element supporting internal housing 121 as mentioned above is pressed via the pressing body 50.

On the one hand, in the present example, the leading end side housing (hereinafter, also referred to as a leading end side housing or simply a housing) 131 forming the leading end part of the part near the leading end of the housing 110 is coaxially fitted and fixed by welding to the leading end facing surface (the annular surface) 122 of the flange 123 of the element supporting internal housing 121 via a seal member 60 described below. That is, a leading end side housing 131 having the cylindrical portion 133 having substantially the same outer diameter as that of the flange 123 and a taper cylinder portion 135 having a taper outer peripheral surface on the leading end side thereof is fixed to the leading end facing surface (the annular surface) 122 of the flange 123 of the element supporting internal housing 121 via the seal member 60 by welding.

Although the seal member 60 is described below, the leading end 136 of the taper cylinder portion 135 forming the leading end side housing 131, that is, the leading end part 137 of a predetermined range rearward from the leading end 136 of the housing 110, is formed on a cylindrical surface so that the inner peripheral surface 137b thereof has the same diameter. Moreover, a diameter D1 of the inner peripheral surface 137b is formed so as to define a leading end side fixed annular gap K1 front and back with the outer peripheral surface 10b of the heater 10. On the one hand, at the back of the inner peripheral surface 137b (the inner peripheral surface 137b of the leading end part 137) forming the cylindrical surface, the inner peripheral surface of the part near the leading end (a part corresponding to the cylindrical portion 133 of the leading end side housing 131) of the housing 110 forms an expanded-diameter annular inner peripheral surface 132 having a diameter further expanded than the inner diameter D1 of the inner peripheral surface 137b of the leading end part 137 forming the leading end side annular gap K1. Moreover, an annular space between the expanded-diameter annular inner peripheral surface 132 and the outer peripheral surface 10b of the heater 10 forms an expanded-diameter annular space K2.

In the present example, a rear end side of the seal member 60 has a size stored in the expanded-diameter annular space K2 and forms a relatively large-diameter cylinder portion 61. A leading end side thereof forms a small-diameter cylindrical portion (a small-diameter cylindrical portion) 65, and a portion between both cylinder portions 61 and 65 is connected by an annular film portion 63 perpendicular to a pole G formed of a metal thin film (membrane) that is easily deformable like a diaphragm in a forward and backward direction. Further, the annular film portion 63 is formed in a deformable manner so as to allow for front and back displacement of the heater 10. Moreover, a fixing flange 62 is included which projects outward in a circular shape and has an outer diameter equal to that of the cylindrical portion 133 of the leading end side housing 131. Meanwhile, the small-diameter cylindrical portion 65 has a size that is externally fitted to the outer peripheral surface 10b of the heater 10.

The seal member 60 has a form interposing the fixing flange 62 of the outside of the large-diameter cylinder portion 61 between the leading end facing surface 122 of the flange 123 of the element supporting internal housing 121 and the cylindrical portion 133 of the leading end side housing 131, and is welded from the outer peripheral surface side along the circumferential direction therebetween. Moreover, a portion between the small-diameter cylindrical portion 65 and the outer peripheral surface 10b of the heater 10 is also welded along the circumferential direction in a predetermined location. In this manner, the front and rear of the expanded-diameter annular space K2 is blocked in an airtight manner by the seal member 60. As a result, even of the combustion gas enters the expanded-diameter annular space K2 of the backside thereof from the leading end 136 of the leading end side housing 131 through the leading end side annular gap K1 between the inner peripheral surface 137b of the leading end part 137 and the outer peripheral surface 10b of the heater 10, the combustion gas is prevented from entering further rearward by the seal member 60.

Meanwhile, in a part of the outer peripheral surface 10b of the heater 10 facing the inner peripheral surface 137b of the leading end part 137 of the housing, the convex portion 70 projecting radially outward is formed to maintain a fixed gap in the radial direction between with the inner peripheral surface 137b of the leading end part 137 of the housing. However, in the present example, the convex portion 70 is formed so as to be connected to the outer peripheral surface 10b of the heater 10 in the circumferential direction. Basically, the convex portion 70 is formed of a cylindrical pipe externally fitted to the heater 10 and is fixed by welding, and thus a gap (an annular gap) is formed between the outer peripheral surface 71 thereof and the inner peripheral surface 137b of the leading end part 137 of the housing. In the present example, the convex portion 70 is fixed so that the leading end 72 thereof is located ahead the leading end 136 of the housing. Further, the rear end 73 of the convex portion 70 is located behind the leading end side annular gap K1, that is, behind the rear end 138 of the inner peripheral surface 137b of the leading end part 137 of the leading end side housing 131.

As a result, the glow plug 901 of the present embodiment is screwed into the plug hole of the engine head, the leading end 10a of the heater 10 is installed so as to be exposed into the combustion chamber N, and a part exposed to the combustion gas receives pressure of the same gas and presses the leading end 10a of the heater 10 rearward. Simultaneously, the gas enters the expanded-diameter annular space K2 via (through) the leading end side annular gap K1 between the inner peripheral surface 137b of the leading end part 137 of the housing 110 and the outer peripheral surface 10b of the heater 10, and presses the leading end facing surface of the annular film member 63 or the like of the seal member 60 as shown in an arrow in FIG. 3. Moreover, the heater 10 is displaced so as to be pressed rearward by the pressure, and the seal member 60 is also deformed so as to follow the displacement. As a result, the piezo-electric element 40 is compressed by the pressing force of the displacement of the heater 10, and the combustion pressure based on the compression is detected. That is, while the heater 10 is pressed rearward from the leading end 10a by the combustion pressure, the seal member 60 is also similarly pressed rearward, and thus the heater 10 is compressed in the pole G direction (rearward) by both forces. Moreover, by the compression force, the piezo-electric element 40 is compressed by the annular plate member 51 of the pressing body 50 fixed to the cylindrical portion 35 of the rear end portion of the sheath pipe exterior pipe 31 and the annular bottom plate 126 of the cylindrical cap 127 fixed to the rear end of the element supporting the internal housing 121. By outputting the voltage signal generated based on the compression force rearward from the respective electrode plates 43 and 44 via a wiring (not shown), the combustion pressure is detected.

Figure 4:
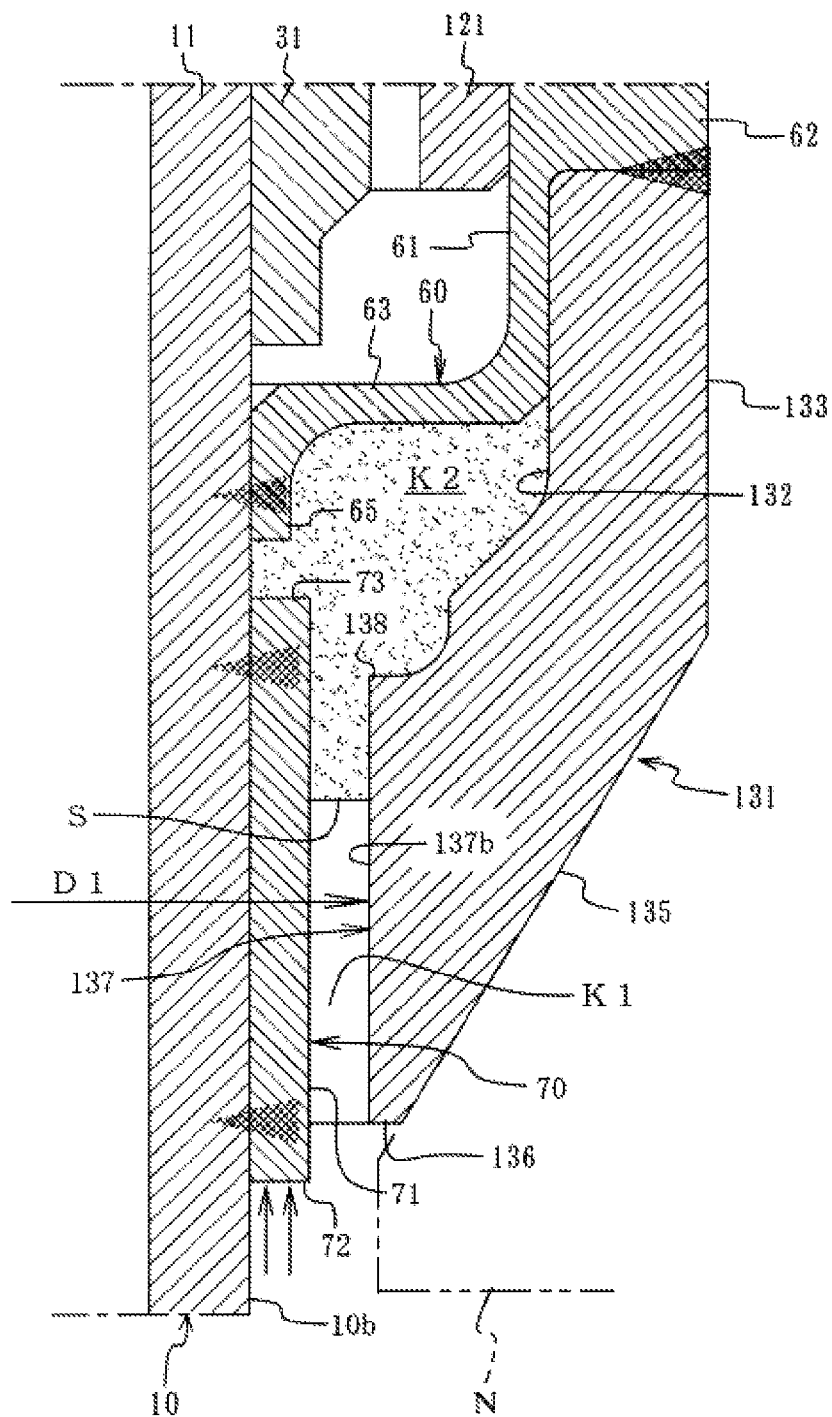
FIG. 4 is a diagram that shows a soot clogging state in FIG. 3.

In this manner, in the glow plug 101 with the combustion pressure detection sensor of the present example, as shown in FIG. 4, when the soot S generated in the process of the combustion of the engine attaches and accumulates on the outer peripheral surface 10b or the like of the heater 10 in the leading end side annular gap K1 and generates soot clogging, the combustion pressure is not directly applied to the leading end facing surface of the seal member 60 therein. However, in the present example, the convex portion 70 is provided in the leading end side annular gap K1 on the outer peripheral surface 10b of the heater 10. For this reason, in a state where the surface of the leading end 72 of the convex portion 70 thereof is exposed without being buried in the soot, the combustion pressure also acts on the leading end 10a of the heater 10 and the surface of the leading end 72 of the convex portion 70 as shown by an arrow in FIG. 4.

In the present example, since the convex portion 70 is provided in a link shape (an annular shape) continuing along the outer peripheral surface 10b of the heater 10, compared to a case (see FIG. 3) where soot clogging does not occur, the force of displacing the heater 10 rearward is reduced. However, even if there is soot clogging as shown in FIG. 4, the combustion pressure can act rearward on the leading end 72 of the convex portion 70. That is, even if there is soot clogging as shown in FIG. 4, the combustion pressure can be applied to the surface of the leading end 72 of the convex portion 70 as well as to the leading end 10a of the heater 10. Thus, as compared to a case where the convex portion 70 is not provided, it is possible to compensate for a decline in the applied combustion pressure. Accordingly, it is possible to reduce or delay the decline in detection accuracy of the combustion pressure. In the present example, since the leading end 72 of the convex portion 70 is located ahead the leading end 136 of the housing, even if soot clogging is applied up to the leading end 136 of the housing of the leading end side annular gap K1, the leading end (the leading end facing surface) 72 of the convex portion 70 is not buried in the soot, and thus does not reduce the detection accuracy of the combustion pressure.

Figure 5:
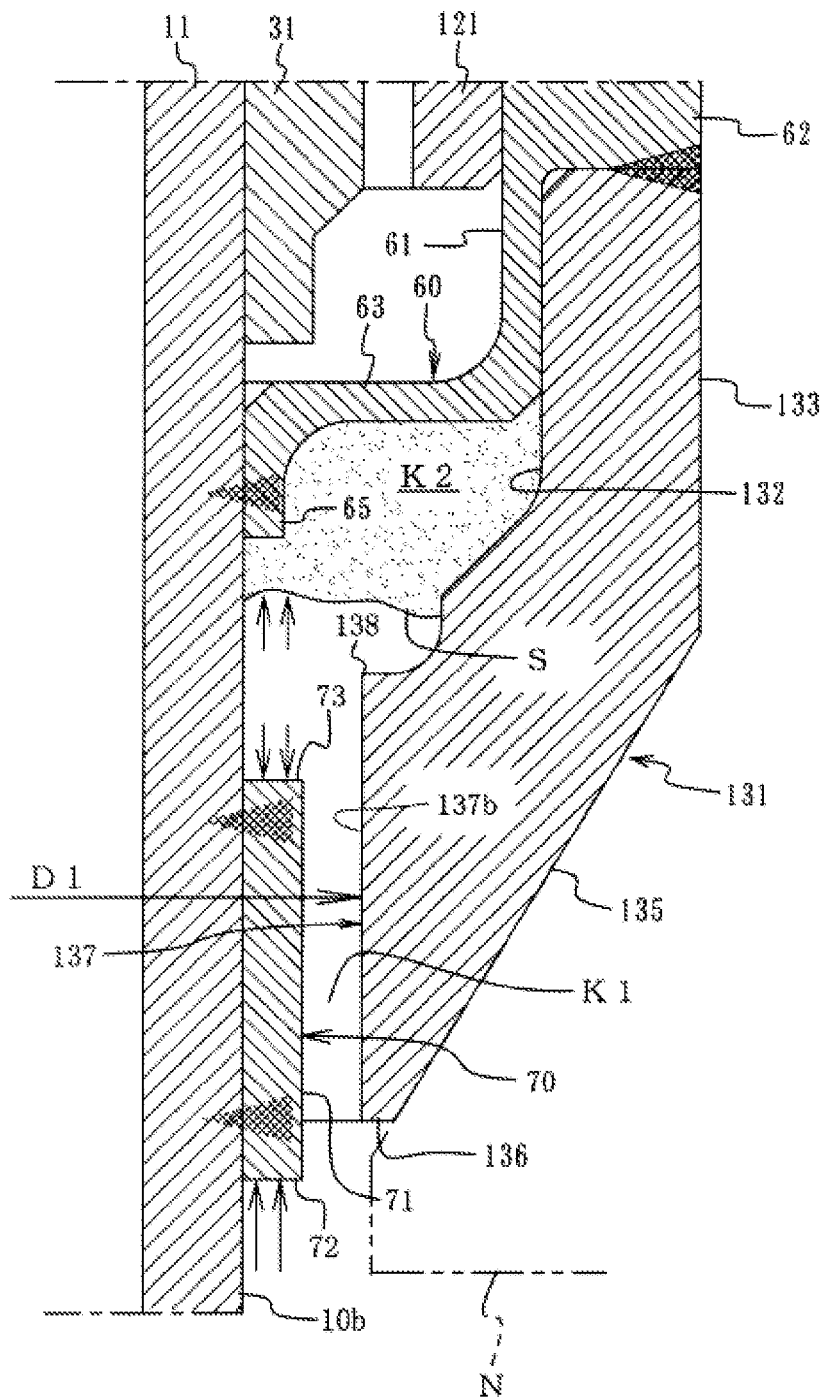
FIG. 5 is an enlarged cross-sectional view of major parts of a modified example in which a rear end of a convex portion is located ahead of a rear end of a leading end part of the housing in the glow plug of FIG. 1.

In addition, in the present example, the rear end 73 of the convex portion 70 is located behind the rear end 138 of the inner peripheral surface 137b (the leading end side annular gap K1) of the leading end part 137 of the housing. For this reason, to address a soot clogging state prior to progressing to the front of the rear end 73 of the convex portion 70, the rear end 73 of the convex portion 70 is located to the front end of the rear end 138 of the inner peripheral surface 137b (the leading end side annular gap K1) of the leading end part 137 of the housing. In this manner, the pressure receiving action of the gas in the leading end 72 of the convex portion 70 is obtained. As in the modified example shown in FIG. 5, the rear end 73 of the convex portion 70 can be located ahead of (to the front of) the rear end 138 of the inner peripheral surface 137b (the leading end side annular gap K1) of the leading end part 137 of the housing. However, in this case, as shown in FIG. 5, when the soot S becomes lodged between the leading end facing surface of the seal member 60 and the rear end 73 of the convex portion 70, such a clogged state is considered to cancel the pressure of the forward and backward direction by the combustion pressure applied in the opposite direction as shown by the arrow. Thus, the pressure receiving action due to the leading end 72 of the convex portion 70 is reduced. However, as in the example mentioned above, by locating the rear end 73 of the convex portion 70 behind the rear end 138 of the leading end side annular gap K1, such a state can be avoided.

In addition, in the embodiment mentioned above, the inner peripheral edge portion of the outer peripheral surface 10b side of the heater 10 of the seal member 60 has a small-diameter cylinder portion 65 forming a cylindrical portion that is bent and extended forward. Moreover, when extending the small-diameter cylinder portion 65 to the part (the part of the inner peripheral surface of the leading end part 137) of the leading end side annular gap K1, the leading end of the small-diameter cylinder portion 65 is moved in the same manner as the convex portion 70 in the present invention. However, the thickness of the seal member 60 is limited to 0.15 to 0.30 mm to be able to secure easily deformable properties. When the small-diameter cylinder portion 65 is made thin in this manner, it is difficult to sufficiently secure the pressure receiving area of the combustion gas in the leading end thereof. Namely, a height dimension T2 protruding from the outer peripheral surface 10b of the heater 10 of the convex portion 70 outward in the radial direction is preferably greater than the thickness of the small-diameter cylinder portion 65 of the seal member 60 (see FIG. 3). That is, by setting the dimension T2 in this manner, the pressure receiving area of the leading end 72 of the convex portion 70 can be increased, and thus, the acting effect of the convex portion 70 can be enhanced.

Figure 6:
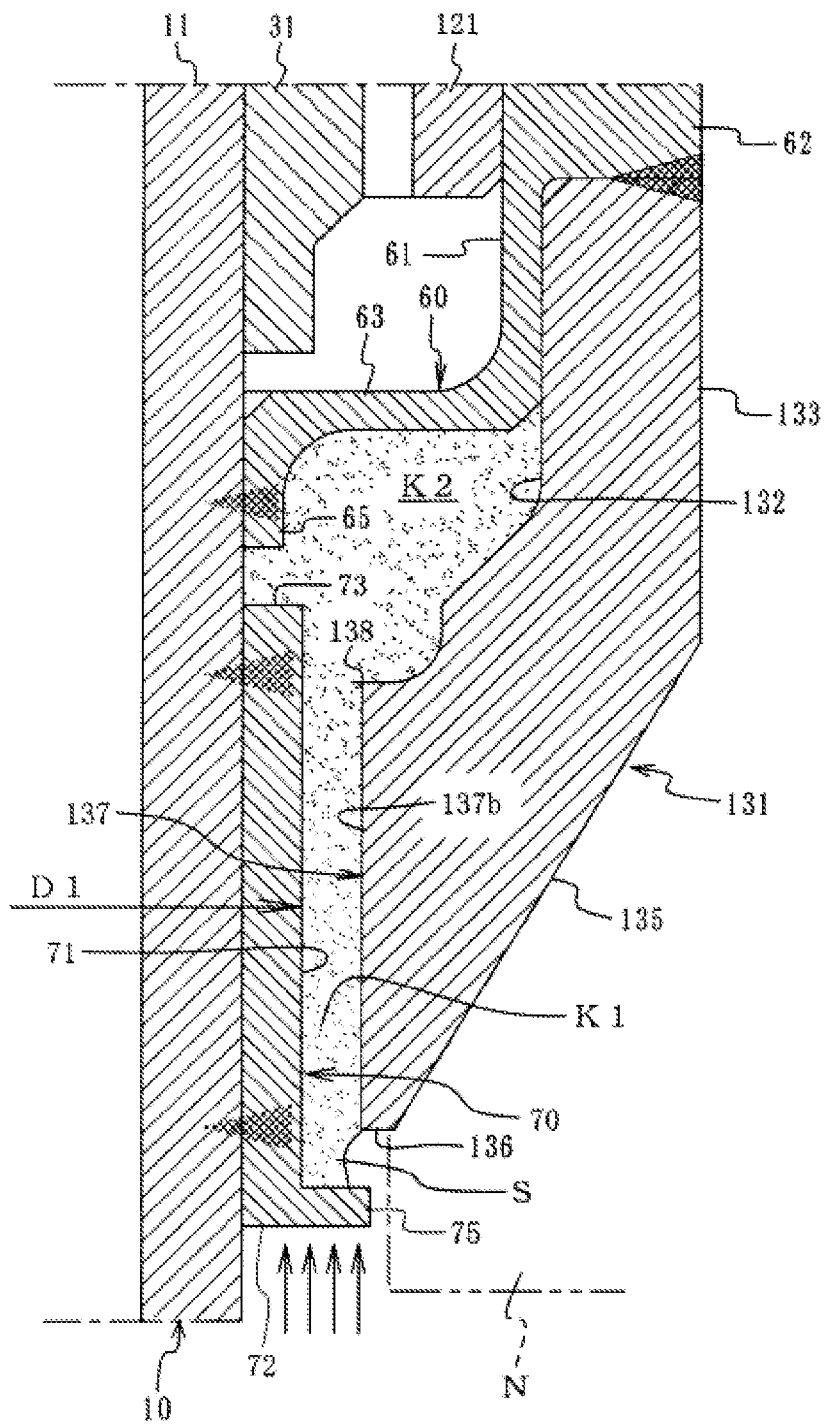
FIG. 6 is an enlarged cross-sectional view of major parts of an improved example in which a protrusion portion is formed on an outer peripheral surface of a leading end of a convex portion in the glow plug of FIG. 1.

Next, another embodiment of the present invention will be described by reference to FIG. 6. The present embodiment is an improved example of the convex portion 70 in the embodiment mentioned above, and thus is not substantially different therefrom. Since the present embodiment is basically the same as the former embodiment, only differences will be described, and the same parts are denoted by the same reference numerals. That is, in the present example, the protrusion portion 75 protruding outward in the radial direction is provided on the outer peripheral surface 71 of the leading end 72 of the convex portion 70 located ahead of the leading end 136 of the leading end side housing 131. However, in the present example, the protrusion portion 75 forms a ring shape along the circumferential direction. In the present example, as shown in FIG. 6, finally, even if soot clogging occurs in which the soot S attaches and accumulates up to the rear end facing surface of the protrusion portion 75 frontward of the leading end 136 of the housing of the leading end side annular gap K1, since the size protruding outward in the radial direction in the leading end 72 of the convex portion 70 can be increased to provide the protrusion portion 75, the pressure receiving area of the combustion gas can be well secured. Thus, it is possible to further reduce a decline in the detection accuracy of the combustion pressure.

That is, in the glow plug with the combustion detection sensor, the gap size of the leading end side annular gap K1 (the gap of one side of the outer peripheral surface 10b of the heater 10 and the outer peripheral surface 137b of the leading end part 137 of the housing) is desirably about 0.25 mm. This is a size required so as not to cause interference with the frontward and rearward movement of the heater 10 even if subject to vibration due to an impact or the like. Meanwhile, in view of the configuration and the size of the glow plug, the upper limit of the gap is about 0.30 mm. For this reason, if the radial outward size of the convex portion 70 alone in the leading end side annular gap K1 is appropriately set, the gap size is not. However, when the leading end 72 of the convex portion 70 is located to the front of the leading end 136 of the housing and the protrusion portion 75 protruding outward in the radial direction is provided in the leading end 72 of the outer peripheral surface 71, there is no limitation. That is, as shown in FIG. 6, by providing the protrusion portion 75, the gap size can be secured, and the pressure receiving area of the combustion gas can be well secured. In addition, an amount of protrusion of the protrusion portion 75 may be set within a range so as not to interfere with attachment or the like to the plug hole of the engine.

Figure 7:
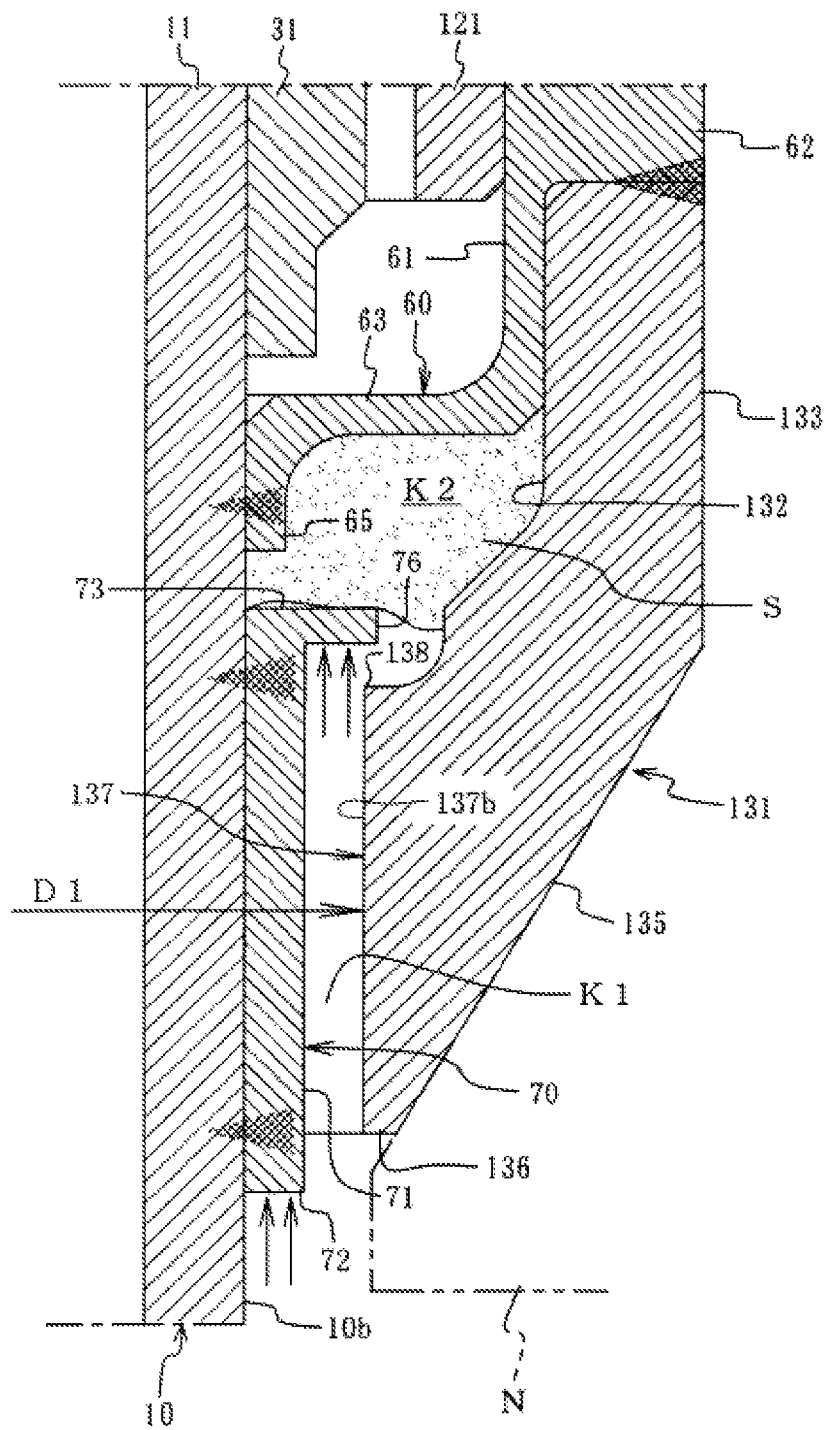
FIG. 7 is an enlarged cross-sectional view of major parts of a modified example in which a protrusion portion is formed on an outer peripheral surface of a rear end of a convex portion in the glow plug of FIG. 1.
Figure 8:
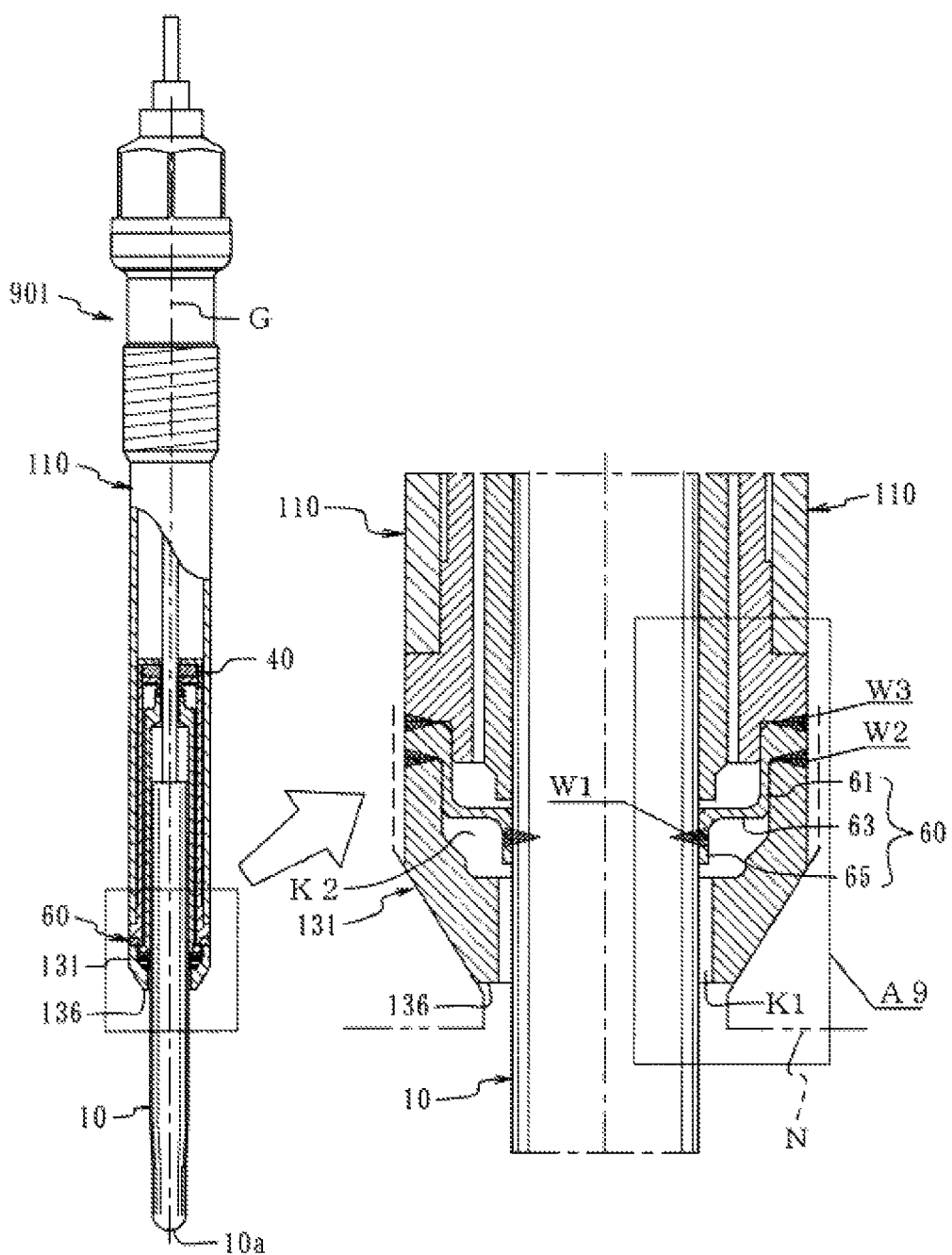
FIG. 8 is a broken longitudinal cross-sectional view that shows an example of the glow plug with the combustion pressure detection sensor of the related art, and an enlarged view of a part near a leading end of the housing.
Figure 9A:
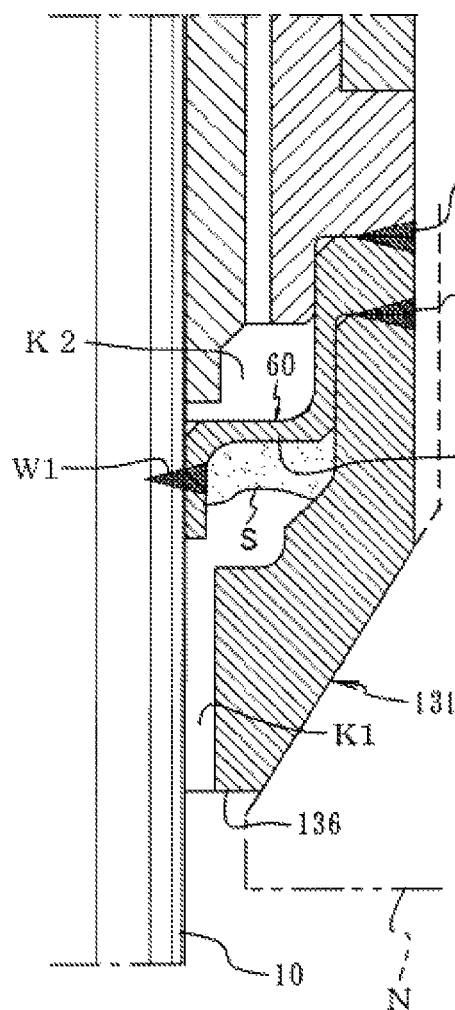
FIGS. 9A and 9B are diagrams that describe a soot clogging state in the enlarged view of the A9 portion of FIG. 8.
Figure 9B:
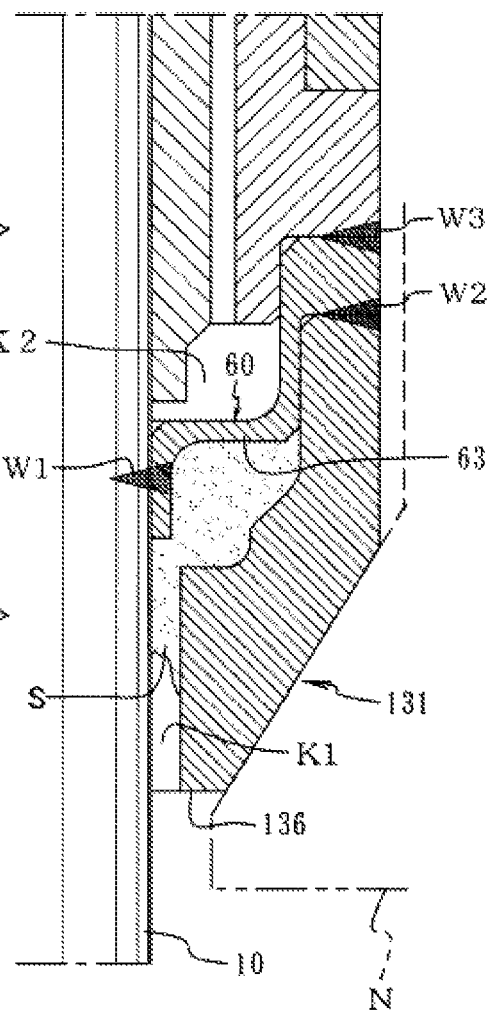

Furthermore, in the present invention, in a part facing the inner peripheral surface 137b of the leading end part 137 of the housing, of the outer peripheral surface 10b of the heater 10, the convex portion 70 protruding outward in the radial direction may be formed so as to secure the gap between the outer peripheral surface 71 of the convex portion 70 and the inner peripheral surface 137b. Thus, the cross-sectional shape of the convex portion 70 can be suitably embodied without being subject to the limitation mentioned above. For example, even in the case of providing the protrusion portion 75 protruding outward in the radial direction on the outer peripheral surface 71 of the convex portion 70, the protrusion portion 75 can be located to the rear of the leading end 72. More specifically, as shown in FIG. 3, in a case of locating the rear end 73 of the convex portion 70 in the expanded-diameter annular space K2 behind the rear end 138 of the leading end side annular gap K1, as shown in FIG. 7, a protrusion portion 76 protruding outward in the radial direction can be provided at the rear end 73. That is, in FIG. 7, the protrusion portion 76 is provided in the expanded-diameter annular space K2. In this case, since the combustion gas can be received even on the leading end facing surface in the protrusion portion 76 of the rear end side, the pressure receiving area can be greatly secured. This is also suitable for a case where the occurrence of the soot S is small, and thus the advancement of the soot clogging is delayed. Furthermore, even if the soot S buries the protrusion portion 76, the same effect as the case of FIG. 4 is obtained.

In addition, although, in the respective embodiments, the convex portion 70 is formed so as to extend in the circumferential direction of the outer peripheral surface 10b of the heater 10, the convex portion may be formed partially in the circumferential direction or intermittently as mentioned above. Furthermore, although the convex portion 70 is formed from a cylindrical pipe externally fitted to the heater 10 and fixed by welding in the present example, the heater 10 may be formed such that the convex portion projects from the outer peripheral surface of the sheath pipe 11 itself forming the heater 10.

Furthermore, in providing a detailed description of the present invention, although the seal member was embodied as a membrane structure, the seal member may assume a diaphragm shape, a bellow shape, etc., without particular limitation. That is, the seal member may be formed in a deformable manner so as to allow displacement of the heater by an arrangement blocking front and rear of the expanded-diameter annular space behind the leading end side annular gap in an airtight manner. Furthermore, in the example mentioned above, although the sensor was embodied as a piezo-electric element, the sensor may be one that is capable of detecting the combustion pressure as the heater is pressed rearward or by displacement of the heater in the forward and rearward direction due to the pressure. Thus, for example, the present invention can also similarly be applied to a glow plug with a combustion pressure detection sensor using a strain sensor as a detection method.

Furthermore, in the glow plug of the example mentioned above, while the heater is constituted by one including a sheath pipe, a sheath pipe exterior pipe or the like, and the housing is embodied as a configuration formed of the housing main body, a leading end side housing or the like, the glow plug can be suitably modified to accommodate the convex portion 70. Furthermore, in the respective examples mentioned above, the expanded-diameter annular gap is formed on the inner surface of the leading end side housing. Also, the outer peripheral edge of the seal member is interposed between the leading end side housing and the flange of the piezo-electric supporting inner housing, and is embodied as being welded and fixed. However, the fixing structure of the seal member to the housing is not limited thereto. Furthermore, in the example mentioned above, although laser welding is used as the fixing means of fixing the seal member, any suitable welding can be used such as electron beam welding and resistance welding. Furthermore, a location not requiring the welding may be fitted using a pressure-fit configuration or the like, and the fixing means of the seal member may use suitable means such as brazing using a brazing material.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based upon and claims the benefit of priority of Japanese Patent Application No. 2011-179808 filed on Aug. 19, 2011 and Japanese Patent Application No. 2012-178562 filed on Aug. 10, 2012, the contents of which are incorporated herein by reference in their entirety.

What is claimed is:

1. A glow plug having a leading front end and an opposing rear end, and including a combustion pressure detection sensor, the glow plug comprising:
   a housing having a cylindrical shape which houses a heater having a pillar shape, a leading end of the heater protruding from a leading end of the housing; and
   a sensor that detects the combustion pressure based on displacement of the heater by action of the combustion pressure,
   the glow plug having an annular gap between an inner peripheral surface of a leading end part of a predetermined range from the leading end of the housing toward a rear part thereof and an outer peripheral surface of the heater, and
   a deformable seal member allowing for displacement of the heater is provided in the annular gap so as to divide the annular gap into front and rear sides, wherein, in the outer peripheral surface of the heater, in a part facing the inner peripheral surface of the leading end part of the housing interposed in the annular gap, a convex portion protruding outward in a radial direction is formed so as to maintain a gap with the inner peripheral surface, wherein the leading end of the convex portion is formed so as to be located to the front of the leading end of the housing, wherein in the seal member, an inner periphery edge portion at the outer peripheral surface side of the heater has a cylindrical portion bent and extended frontwards, the cylindrical portion being fixed to the outer peripheral surface of the heater, and wherein in a radial direction, an outermost peripheral portion of the convex portion is located outside the outer peripheral portion of a leading end of the cylindrical portion of the seal member.

2. The glow plug as claimed in claim 1, wherein a leading end side annular gap forms between the inner peripheral surface of the leading end part of the predetermined range from the leading end of the housing toward the rear part thereof and the outer peripheral surface of the heater, an inner peripheral surface of a part of the housing near the leading end thereof and to the rear of the leading end side annular gap forms an expanded-diameter annular inner peripheral surface having a diameter greater than that of the inner peripheral surface of the leading end part, and the seal member is provided in an expanded-diameter annular space defined between the expanded-diameter annular inner peripheral surface and the outer peripheral surface of the heater so as to divide the expanded-diameter annular space into front and rear sides.

3. The glow plug as claimed in claim 2, wherein the convex portion includes a protrusion portion protruding outward in the radial direction from an outer peripheral surface of the convex portion in the leading end thereof.

4. The glow plug as claimed in claim 1, wherein the convex portion is formed of a cylindrical body or an annular body externally fitted and fixed to the heater.

* * * * *